(12) United States Patent
Lehner et al.

(10) Patent No.: US 11,705,597 B2
(45) Date of Patent: Jul. 18, 2023

(54) ENERGY STORAGE UNIT MOUNTING FACILITY AND ARRANGEMENT OF THE SAME AND MULTIPLE ENERGY STORAGE UNITS

(71) Applicant: MAN Energy Solutions SE, Augsburg (DE)

(72) Inventors: Susanne Lehner, Augsburg (DE); Carina Kern, Augsburg (DE); Michael Pilawa, Geisenfeld (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 265 days.

(21) Appl. No.: 16/881,126

(22) Filed: May 22, 2020

(65) Prior Publication Data

US 2020/0373533 A1 Nov. 26, 2020

(30) Foreign Application Priority Data

May 24, 2019 (DE) .................... 10 2019 113 901.5

(51) Int. Cl.
*H01M 50/209* (2021.01)

(52) U.S. Cl.
CPC ...... *H01M 50/209* (2021.01); *H01M 2220/20* (2013.01)

(58) Field of Classification Search
CPC ............. H01M 50/20; H01M 2220/20; H01M 50/209; H01M 50/202; H01M 10/425; H01M 2010/4271; H01M 2220/10; Y02E 60/10

See application file for complete search history.

(56) References Cited

U.S. PATENT DOCUMENTS

| | | | |
|---|---|---|---|
| 5,610,802 A | 3/1997 | Eidler et al. | |
| 2006/0152906 A1* | 7/2006 | Miller | H01M 10/6562 361/716 |
| 2009/0139940 A1* | 6/2009 | Maniscalco | H01M 50/296 211/49.1 |
| 2014/0097797 A1* | 4/2014 | Hendrix | H01M 10/637 320/118 |
| 2015/0093982 A1* | 4/2015 | Bailey | H01M 50/224 454/184 |

(Continued)

FOREIGN PATENT DOCUMENTS

| | | |
|---|---|---|
| CN | 201163652 Y | 12/2008 |
| CN | 101859882 | 10/2010 |
| CN | 102210039 | 10/2011 |

(Continued)

OTHER PUBLICATIONS

Machine English translation of CN208256768 (Year: 2018).*

(Continued)

*Primary Examiner* — Michael L Dignan

(74) *Attorney, Agent, or Firm* — Cozen O'Connor

(57) ABSTRACT

An energy storage unit mounting facility, having a basic body, which defines multiple mounting regions arranged vertically on top of one another for at least one electric energy storage unit. The electric energy storage unit is introducible into the mounting region in the horizontal direction and removable from the mounting region in the horizontal direction. Securing devices are provided to secure the electric energy storage unit in the mounting region.

10 Claims, 5 Drawing Sheets

(56) References Cited

U.S. PATENT DOCUMENTS

2018/0130983 A1* 5/2018 Tessier .................. H01M 50/20

FOREIGN PATENT DOCUMENTS

| CN | 103503192 |   | 1/2014  |         |          |
|----|-----------|---|---------|---------|----------|
| CN | 205 810903 | U | 12/2016 |         |          |
| CN | 208175182 | U | 11/2018 |         |          |
| CN | 208256768 | * | 12/2018 | ............. | H01M 2/10 |
| CN | 208256768 | U | 12/2018 |         |          |
| FR | 2970456   |   | 7/2012  |         |          |
| WO | WO 2017/118645 | * | 7/2017  | ............. | B66C 1/100 |

OTHER PUBLICATIONS

Machine English translation of WO2017/118645 (Year: 2017).*
Office Action dated Jan. 23, 2020 issued in German Patent Application No. 102019113901.5.
Office Action dated Nov. 29, 2022 issued in Chinese Patent Application No. 202010441934.4.
Office Action dated Feb. 20, 2023 issued in Finnish Patent Application No. 20205521.

* cited by examiner

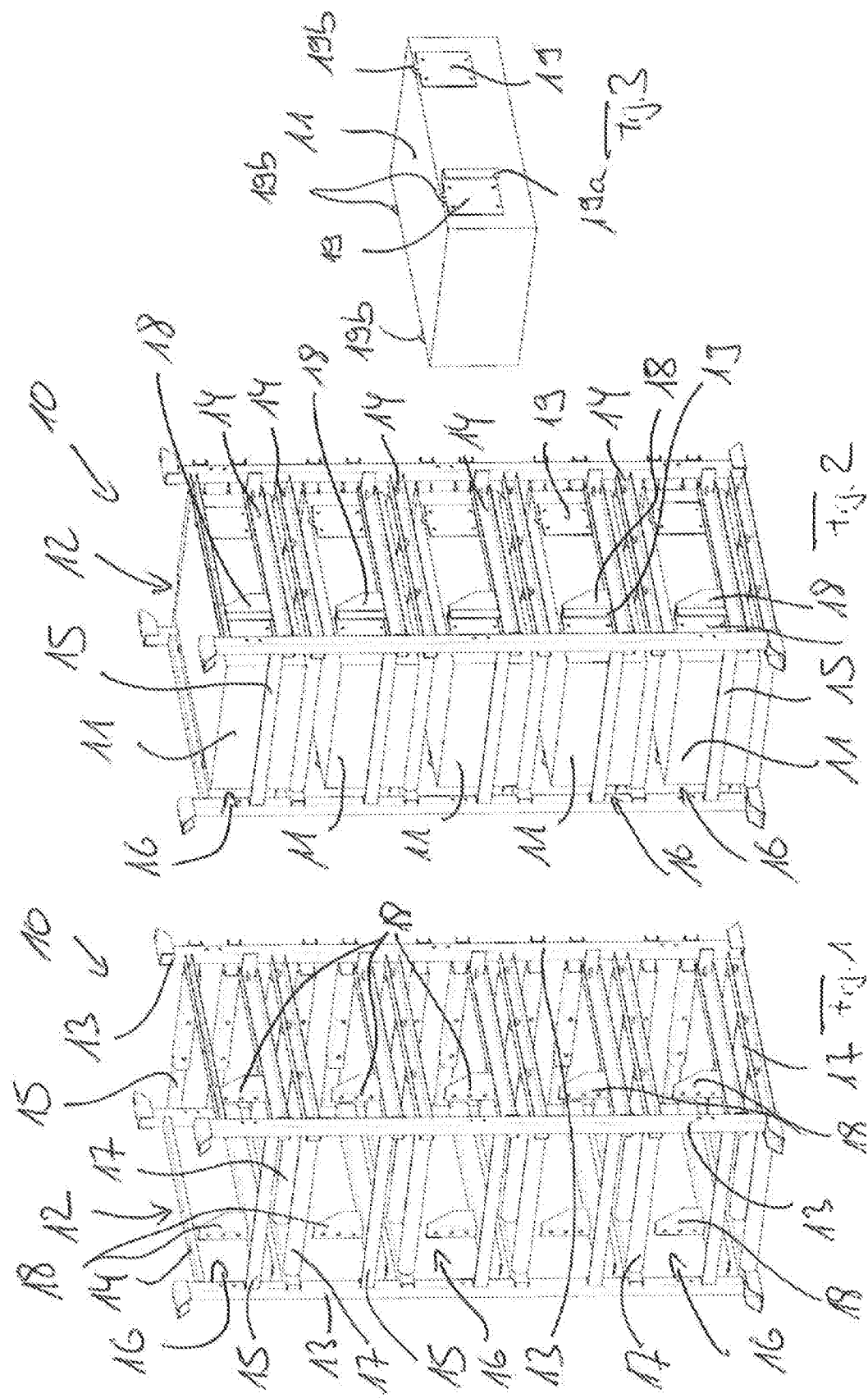

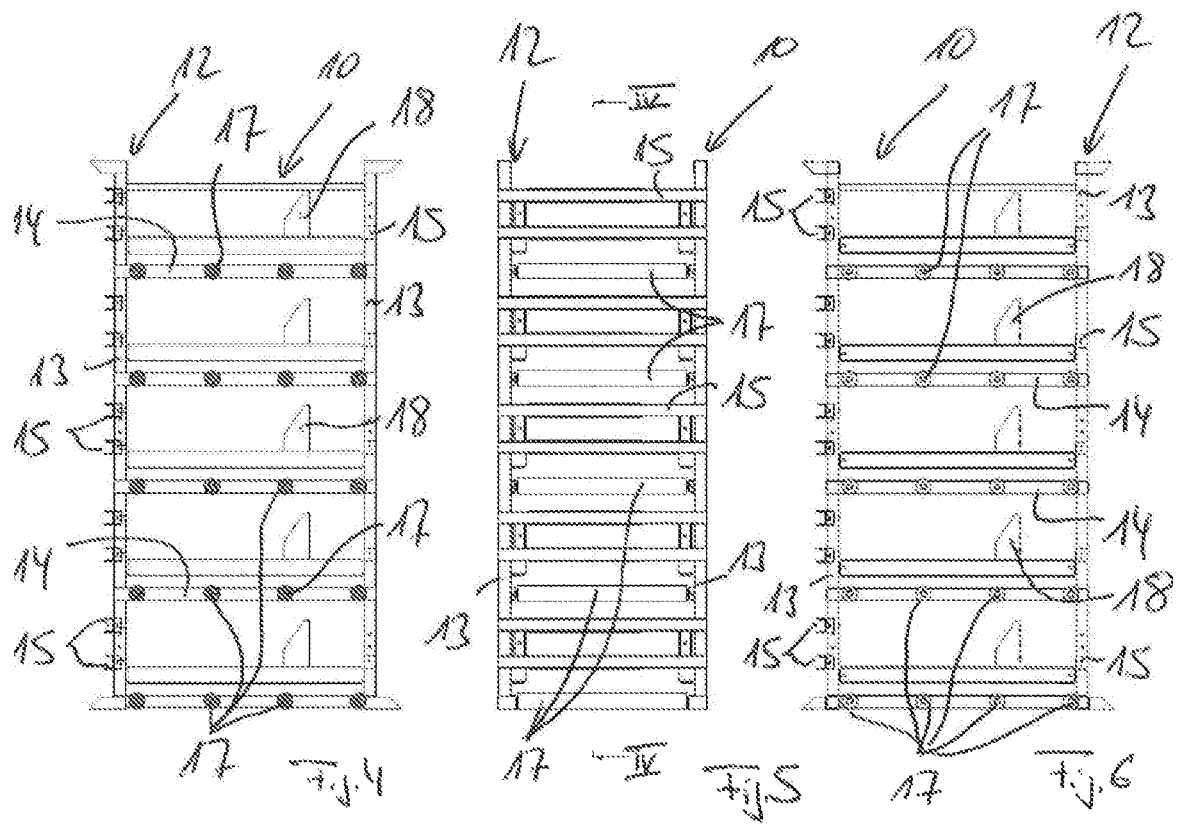
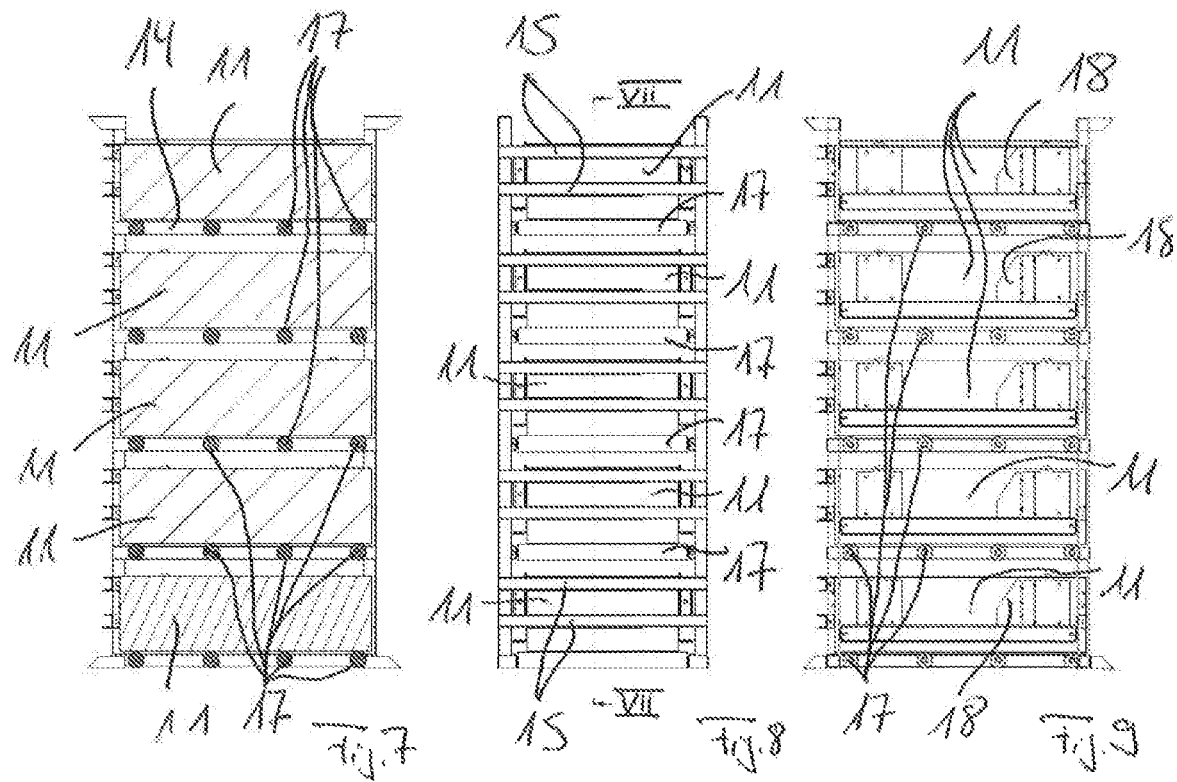

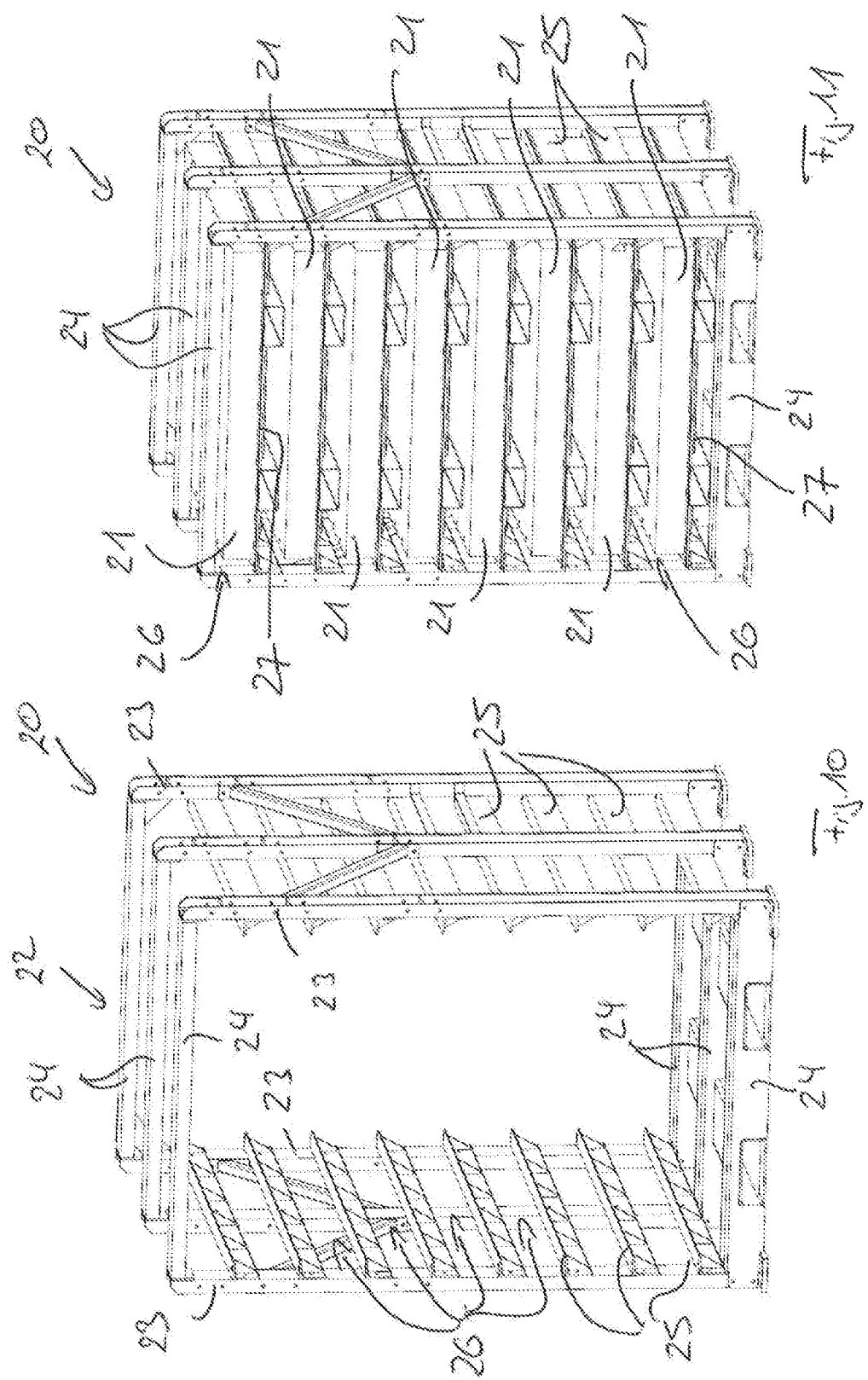

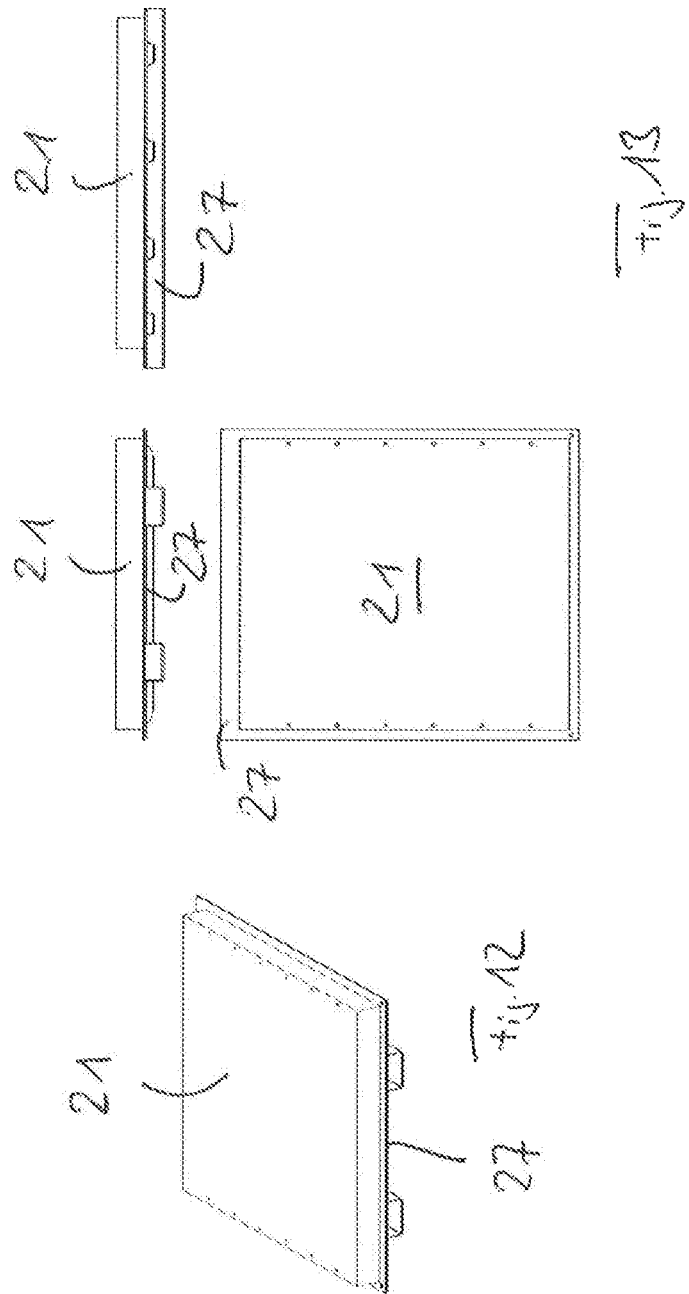

ENERGY STORAGE UNIT MOUNTING FACILITY AND ARRANGEMENT OF THE SAME AND MULTIPLE ENERGY STORAGE UNITS

BACKGROUND OF INVENTION

1. Field of the Invention

The invention relates to an energy storage unit mounting facility, to an arrangement of the energy storage unit mounting facility, and multiple energy storage units.

2. Description of Related Art

In maritime and stationary applications there is increasingly a need for storing electric energy and utilizing the stored electric energy for example as traction energy or for supplying an on-board electrical system. In particular when relatively large and heavy electric energy storage units are employed, the handling of the same has proven to be difficult up to now. For this reason, only relatively small and light energy storage units are being utilised up to now in order to be able to comfortably handle the same. It has not been possible up to now to suitably handle large and heavy energy storage units, in particular electric energy storage units which are being employed as traction batteries in motor vehicles up to now.

SUMMARY OF THE INVENTION

There is therefore a need for an energy storage unit mounting facility that makes possible handling large and heavy electric energy storage units.

One aspect of the invention is a new type of energy storage unit mounting facility.

The energy storage unit mounting facility according to one aspect of the invention comprises a rack-like or frame-like basic body that defines multiple mounting regions arranged vertically on top of one another for at least one electric energy storage unit each. The respective electric energy storage unit is introducible into the respective mounting region in the horizontal direction and removable from the respective mounting region in the horizontal direction.

The energy storage unit mounting facility according to one aspect of the invention furthermore comprises safety devices in order to secure the respective electric energy storage unit introduced into the respective mounting region in the respective mounting region.

The energy storage unit mounting region according to one aspect of the invention allows a safe handling of relatively large and relatively heavy energy storage units, such as for example automotive batteries, which have been employed as traction batteries in electric and hybrid vehicles up to now. Multiple such electric energy storage units can be received and placed vertically on top of one another in the mounting regions of the energy storage unit mounting facility. For access to individual energy storage units, the same can be removed from the respective mounting region and introduced into the respecting mounting region in the horizontal direction.

Preferentially, the energy storage unit mounting region comprises conveyors to introduce the respective electric energy storage unit into and remove the respective electric energy storage unit from the respective mounting region in the horizontal direction. The conveyors support the movement of the respective electric energy module in the horizontal direction while the same are introduced into or removed from the respective mounting region. By way of this, the handling of energy storage units in the region of the energy storage unit mounting facility is facilitated.

Preferentially, securing devices fix the respective electric energy storage unit on the rack-like or frame-like basic body. Alternatively or preferentially additionally, securing devices hold the respective electric energy storage unit in a state fixed to the basic body and not fixed to the basic body in the respective mounting region. By way of the securing devices, electric energy storage units arranged in corresponding mounting regions of the energy storage unit mounting facility are secured in their position. An unintentional moving-out of an energy storage unit from its respective mounting region can thereby be prevented.

Multiple energy storage units can also communicate by a so-called energy management system (EMS) by way of a control unit. The control unit combines the signals of individual energy storage units and transmits combined signals to the EMS. A further functionality of the control unit then is the switching-on and isolating of individual energy storage units and the simulation of a vehicle environment by signals.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

FIG. 1 is a perspective view of an energy storage unit mounting facility according to the invention, without an energy storage unit;

FIG. 2 is an arrangement of the energy storage unit mounting facility of FIG. 1 and multiple energy storage units;

FIG. 3 is an energy storage unit;

FIGS. 4 to 6 are views of the energy storage unit mounting facility of FIG. 1;

FIGS. 7 to 9 are views of the arrangement of FIG. 2;

FIG. 10 is a perspective view of an energy storage unit mounting facility according to the invention without energy storage unit;

FIG. 11 is an arrangement of the energy storage unit mounting facility of FIG. 10 and multiple energy storage units;

FIGS. 12 and 13 are multiple views of an energy storage unit; and

DETAILED DESCRIPTION OF THE PRESENTLY PREFERRED EMBODIMENTS

Figure 14:
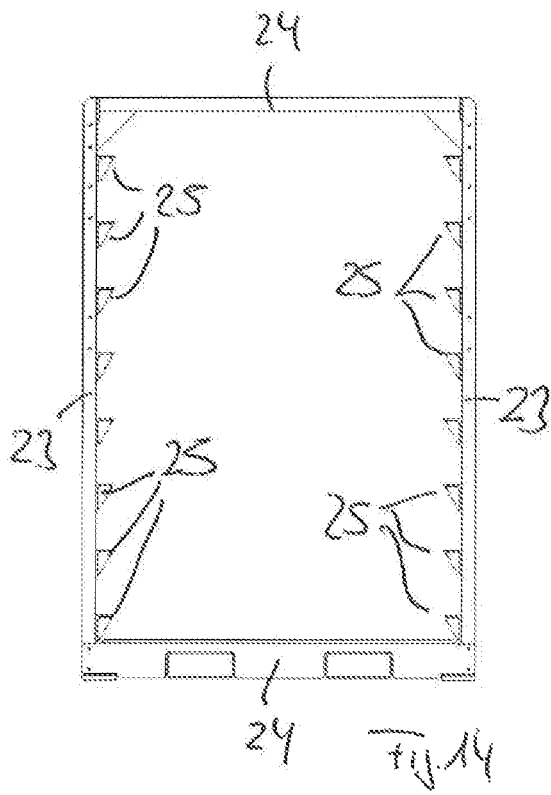
FIGS. 14 and 15 are views of the energy storage unit mounting facility of FIG. 10.

FIGS. 1 to 9 show different views of a first embodiment of an energy storage unit mounting facility 10 in terms of the invention present here, namely FIGS. 1, 4, 5, and 6 each without electric energy storage unit 11 and FIGS. 2, 7, 8, and 9 each with multiple electric energy storage units 11. FIG. 3 shows an electric energy storage unit 11 in sole representation.

The energy storage unit mounting facility 10 comprises a rack-like or frame-like basic body 12 having multiple stanchions 13 extending in the vertical direction and multiple crosspieces 14, 15 extending in the horizontal direction between the stanchions 13. Between the stanchions 13 extending in the vertical direction, crosspieces 14 and 15 running parallel to one another extend on opposite sides in each case.

The rack-like or frame-like basic body 12 defines multiple mounting regions 16 for electric energy storage units, which are arranged vertically on top of one another. In the shown exemplary embodiment, the rack-like or frame-like basic body 12 provides 5 mounting regions 16 arranged vertically on top of one another each for an electric energy storage unit 11.

The respective electric energy storage unit 11 can be introduced into the respective mounting region 16 in the horizontal direction and removed from the respective mounting region 16 in the horizontal direction, namely in a direction that is parallel to the crosspieces 14 extending in the horizontal direction.

Introducing and removing the respective electric energy storage unit 11 from the respective mounting region 16 is preferably effected exclusively on a single side of the basic body 12, namely on the respective left side of the basic body 12 shown in FIGS. 1 and 2. On this side, the crosspieces 15 extending transversely to the introduction and removing direction are demountable in order to either introduce an electric energy storage unit 11 into the respective mounting region 16 or remove an electric energy storage unit 11 from the respective mounting region 16.

On the opposite side of the basic body 12, by contrast, the crosspieces 15 are mounted fixed to the stanchions 13, so that on this opposite side the electric energy storage units 11 cannot be moved out of the mounting regions 16 or introduced into the same.

In the exemplary embodiment of FIGS. 1 to 9, the energy storage unit mounting facility 10, according to one aspect of the invention, comprises conveyors to introduce and remove the respective electric energy storage unit 11 into and from the respective mounting region 16 in the horizontal direction, wherein this conveyor in the exemplary embodiment of FIGS. 1 to 9 comprises conveyor rollers 17, which are rotatably mounted in each case on two crosspieces 14 of the basic body 12 running parallel to one another. By way of these rollers 17, the energy storage units 11 can be easily moved in the horizontal direction relative to the basic body 12 in order to introduce or remove the same into or from a respective mounting region 16.

The energy storage unit mounting facility 10 comprises securing devices 14, 15, 18 to secure the respective energy storage unit 11 in its respective mounting region 16.

First securing elements 18 act on crosspieces 14 of the rack-like or frame-like basic body 12, which extend parallel to the crosspieces 14, on which the conveyor rollers 17 are rotatably mounted. Those first securing elements 18, via which an electric energy storage unit 11 positioned in a respective mounting region 16 is to be secured in its position in the mounting region 16 are arranged above the conveyor rollers 17, by way of which the respective electric energy storage unit 11 can be introduced into and removed from this mounting region 16.

These first securing elements 18 serve for fastening the respective electric energy storage unit 11 to the rack-like or frame-like basic body 12, wherein these first securing elements 18 interact with holders 19 fastened to the respective electric energy storage unit 11.

Those holders 19 of the respective electric energy storage unit 11, which interact with the first securing elements 18, have an angled section 19a, via which the respective holder 19 and thereby the respective electric energy storage unit 11 can be screwed to the respective first securing device 18.

The holders 19, which are fastened to the electric energy storage units 11, furthermore, serve as connecting elements for a vertical conveyor, in particular for a crane.

On sections 19b of the holders 19, which opposite the electric energy storage unit 11 project vertically upwards, eyes are formed, into which a transport chain can be threaded to thereby couple an electric energy storage unit 11 to a crane and move a respective electric energy storage unit 11 by way of the crane either into the region of the energy storage unit mounting facility 10 or away from the same.

Second securing devices hold the respective electric energy storage unit 11 in a state fixed on the basic body 12 and not fixed on the basic body 12 in the respective mounting region 16, wherein these second securing devices in the exemplary embodiment of FIGS. 1 to 9 are provided by the crosspieces 14, 15, which laterally hold the respective energy storage unit 11 in the respective mounting region 16. While FIGS. 1 and 2 show perspective views of the first embodiment of the energy storage unit mounting facility 10 or an energy storage unit mounting facility 10 loaded with electric energy storage units 11, FIGS. 5, 6, 8, and 9 each show a lateral view of the energy storage unit mounting facility 10 or the arrangement of the energy storage unit mounting facility 10 and the electric energy storage units 11 offset by 90° relative to one another, wherein FIG. 4 shows the cross section IV-IV of FIG. 5 and FIG. 7 the cross section VII-VII of FIG. 8.

Figure 15:
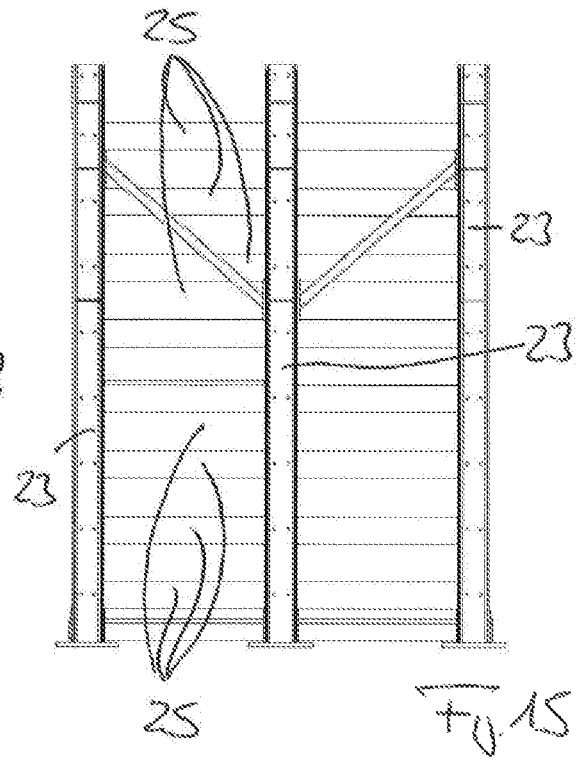
Figure 16:
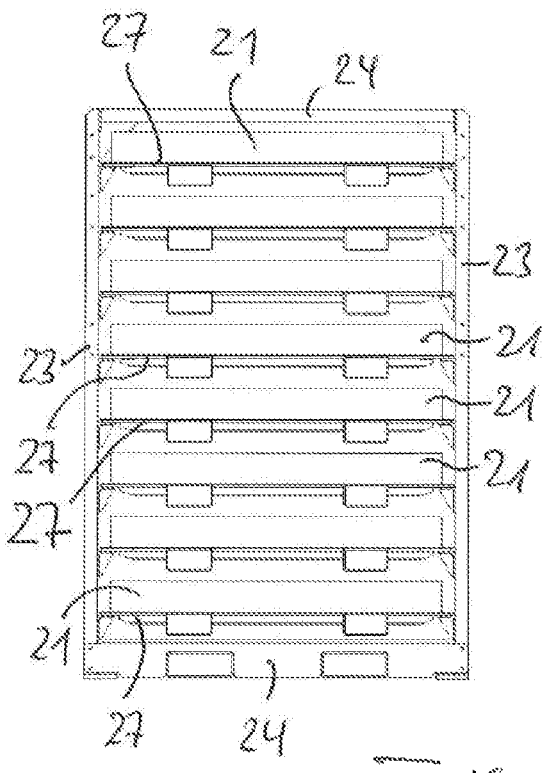
FIGS. 16 and 17 are views of the arrangement of FIG. 11.
Figure 17:
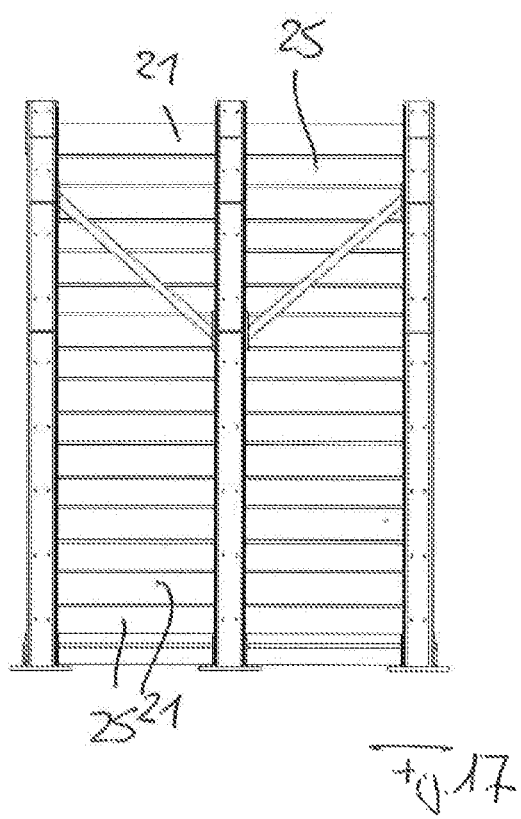

FIGS. 10 to 17 show different views of a second exemplary embodiment of an energy storage unit mounting facility 20 according to the invention, wherein the energy storage unit mounting facility 20 of the version of FIGS. 10 to 17 also accommodates multiple electric energy storage units 21.

The energy storage unit mounting facility 20 of the exemplary embodiment of FIGS. 10 to 17 in turn comprises a rack-like or frame-like basic body 22 of stanchions 23 extending in the vertical direction and of crosspieces 24, 25 extending between the stanchions 23 in the horizontal direction. Here, the crosspieces 24 positioned at the top and the bottom of the basic body 22 and the crosspieces 25 running on the sides each extend parallel to one another.

The rack 22 of the energy storage unit mounting facility 20 in turn defines multiple mounting regions 26 vertically on top of one another for the electric energy storage units 21 to be positioned vertically on top of one another, wherein each electric energy storage unit 21 is introducible into and removable from its respective mounting region 26 in the horizontal direction, namely in a direction parallel to the crosspieces 25.

In the exemplary embodiment of FIGS. 10 to 17, the energy storage unit mounting facility 20 does not have a separate conveyor, but the energy storage units 21 in the exemplary embodiment of FIGS. 10 to 17 according to FIGS. 12 and 13 are mounted on pallet-like support bodies 27, via which the electric energy storage units 21 can be lifted for example by a lifting element and introduced into the mounting regions 26.

The electric energy storage units 21 mounted on the pallet-like support bodies 27 can then, when the same have been introduced into the mounting regions 26, support themselves on the crosspieces 25 via the support body 27, be screwed to the crosspieces 25, to secure the electric energy storage units 21 in their respective mounting regions 26 in this way.

Accordingly, the crosspieces 25 in the shown exemplary embodiment provide the first and second securing devices via which the respective energy storage units 21 can be connected, via the pallet-like support bodies 27, on which the same are mounted to the rack-like or frame-like basic body 22. Furthermore, the crosspieces 25 hold the respective electric energy storage unit 21 in a state in which it is fixed on the rack-like or frame-like basic body 22 and a state in which it is not fixed on the rack-like or frame-like basic body 22 in the respective mounting region 26. In a further embodiment of the invention which is not shown it is possible that the energy storage unit mounting facility comprises conveyors designed in the manner or drawers wherein the energy storage units are then inserted into such drawers. By horizontally moving the drawers, the electric energy storage units can then be moved out of their mounting regions or into the same.

With one aspect of the invention it is possible to easily handle large and heavy electric energy storage units 11, 21 having a weight of in particular more than 150 kg, in order to also make possible an individual electric energy storage units 11, 21 positioned in the energy storage unit mounting facility 10, 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An energy storage unit mounting facility, comprising
a rack-like or frame-like basic body comprising stanchions extending in a vertical direction and first and second crosspieces extending horizontally between the stanchions, which defines multiple mounting regions arranged vertically on top of one another for at least one respective electric energy storage unit, wherein the respective electric energy storage unit is introducible into and removable from the respective mounting region in a horizontal direction, wherein each electric energy storage unit has an electric energy storage unit holder;
respective conveyors arranged on the first crosspieces in each mounting region perpendicular to the horizontal direction by which the respective electric energy storage unit is introducible into and removable and that laterally span the respective mounting region and configured to introduce and remove the respective electric energy storage unit into and from the respective mounting region in the horizontal direction, wherein the respective conveyors in each mounting region extend perpendicularly from respective crosspieces; and
securing devices configured to secure the respective electric energy storage unit introduced into the respective mounting region in the respective mounting region, comprising:
first securing devices connected to the stanchions that extend parallel to the horizontal direction and having a portion that extends vertically parallel to the horizontal direction and configured to mate with a portion of each respective electric energy storage unit holder; and
the second crosspieces configured as second securing devices configured to hold each respective electric energy storage unit laterally in the respective mounting region,
wherein for each respective mounting region the first securing devices and the second securing devices are arranged vertically above the respective conveyors arranged in each mounting region.

2. The energy storage unit mounting facility according to claim 1, wherein the each conveyor comprises conveyor rollers that are rotatably mounted on crosspieces running parallel to one another of the rack-like or frame-like basic body.

3. The energy storage unit mounting facility according to claim 1, wherein the conveyors are formed as drawers.

4. The energy storage unit mounting facility according to claim 1, wherein the securing devices fix the respective electric energy storage unit on the rack-like or frame-like basic body.

5. The energy storage unit mounting facility according to claim 1, wherein the electric energy storage unit holders are connecting elements for a vertical conveyor.

6. The energy storage unit mounting facility according to claim 1, wherein the securing devices hold the respective electric energy storage unit in a state in the respective mounting region in which it is fixed to the rack-like or frame-like basic body.

7. The energy storage unit mounting facility according to claim 1, wherein the respective electric energy storage unit is introducible into and removable from the respective mounting region exclusively on one side.

8. The energy storage unit mounting facility according to claim 1, wherein the securing devices hold the respective electric energy storage unit in a state in the respective mounting region in which it is not fixed to the rack-like or frame-like basic body.

9. The energy storage unit mounting facility according to claim 1, wherein the portion of each respective electric energy storage unit holder is angled to extend away from the respective electric energy storage unit and secured to the vertically extending portion of the first securing device.

10. An arrangement of an energy storage unit mounting facility, comprising:
multiple electric energy storage units, each having an electric energy storage unit holder;
a rack-like or frame-like basic body comprising stanchions extending in a vertical direction and first and second crosspieces extending between the stanchions in the horizontal direction, which defines multiple mounting regions arranged vertically on top of one another for at least one respective electric energy storage unit, wherein the respective electric energy storage unit is introducible into and removable from the respective mounting region in a horizontal direction;
respective conveyors arranged on the first crosspieces in each mounting region perpendicular to the horizontal direction by which the respective electric energy storage unit is introducible into and removable and that laterally span the respective mounting region and configured to introduce and remove the respective electric energy storage unit into and from the respective mounting region in the horizontal direction, wherein the respective conveyors in each mounting region extend perpendicularly from respective crosspieces; and securing devices configured to secure the respective electric energy storage unit introduced into the respective mounting region in the respective mounting region, comprising:

- a first securing device connected to the stanchions that extend parallel to the horizontal direction and having a portion that extends vertically parallel to the horizontal direction and configured to mate with a portion of each respective electric energy storage unit holder; and
- the second crosspieces configured as second securing device configured to hold each respective electric energy storage unit laterally in the respective mounting region, wherein for each respective mounting region the first securing devices and the second securing devices are arranged vertically above the respective conveyors and crosspieces arranged in each mounting region.

* * * * *